T. LLEWELLYN.
Planing Machine.
No. 108,801.  Patented Nov. 1, 1870.
2 Sheets—Sheet 1.
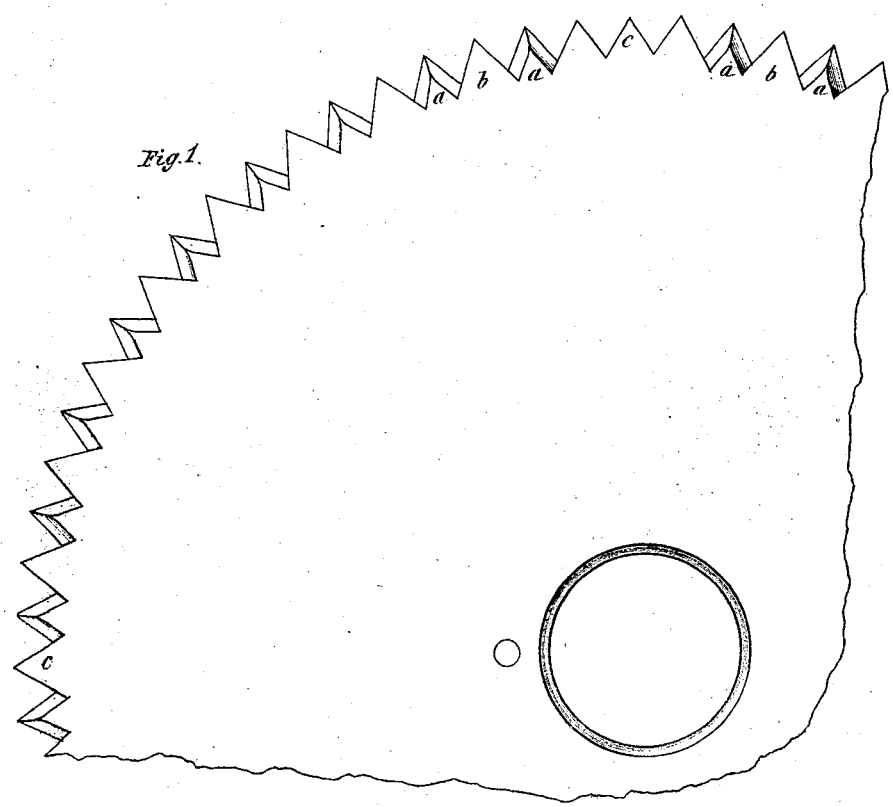

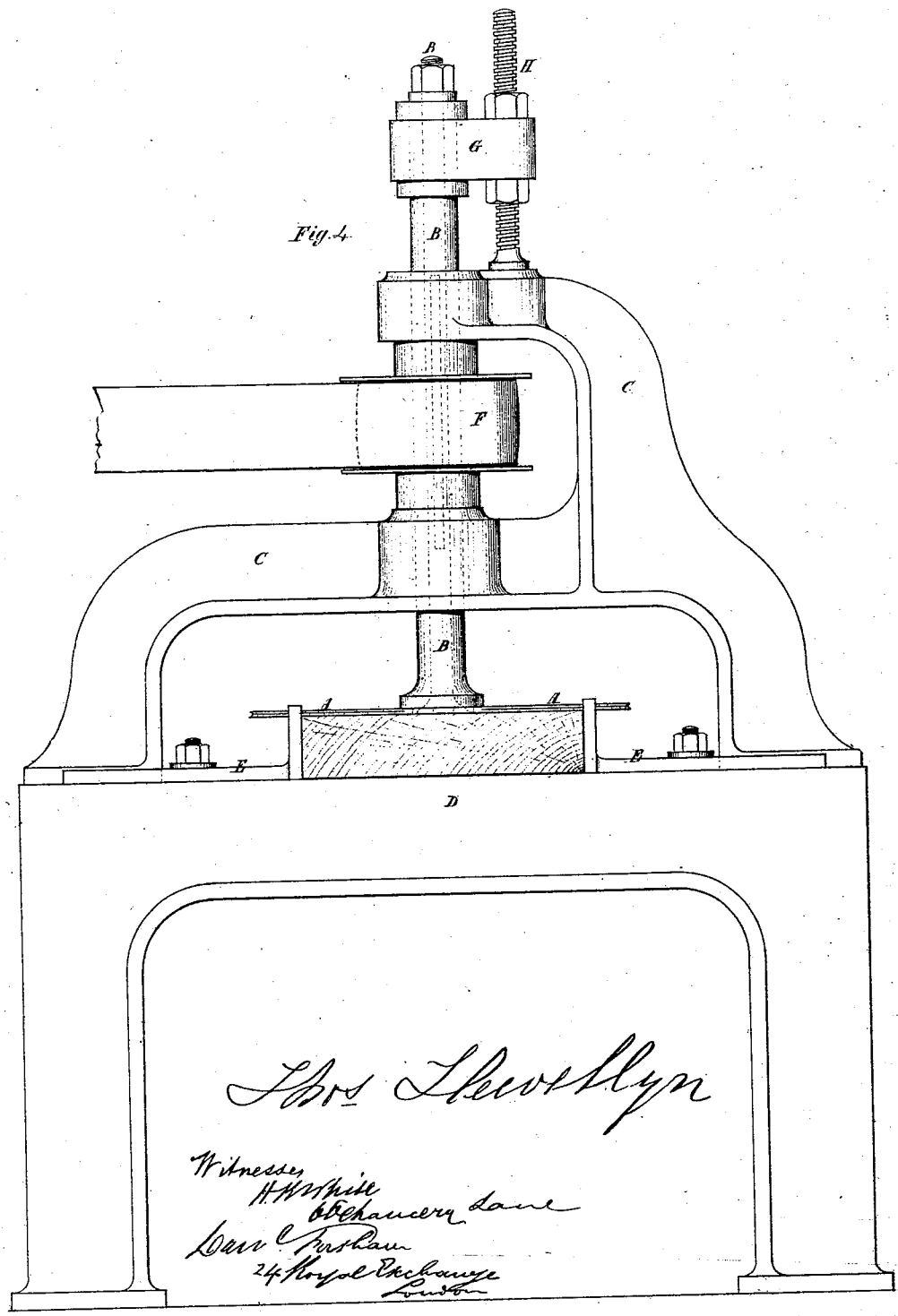

United States Patent Office.

THOMAS LLEWELLYN, OF LONDON, ENGLAND.

Letters Patent No. 108,801, dated November 1, 1870.

IMPROVEMENT IN PLANING-MACHINES.

The Schedule referred to in these Letters Patent and making part of the same.

*To all whom it may concern:*

Be it known that I, THOMAS LLEWELLYN, of Great Portland street, in the county of Middlesex, London, England, have invented a new and improved Construction of Cutter applicable to the Squaring, Planing, Grooving, and Rebating of Wood; and I do hereby declare the following to be a full, clear, and exact description of the same, reference being had to the accompanying drawing forming a part of this specification.

This invention relates to improvements in planing-machines, and consists in the combination and arrangement of parts, as hereinafter described.

In the accompanying drawing—

Figure 1 is a plan view at full size of a portion of the rotary tool or cutter;

Figure 2 is a partial edge view of the same;

Figure 3 is a section through the center of the tool showing the mode of mounting the same; and Figure 4 is a side elevation of the tool mounted in a frame.

This tool may be mounted on a machine fitted with an automatic feed, and it may work either in a vertical or a horizontal plane, or the work may be fed to the tool by hand.

In fig. 4 I have shown the tool at A as carried by a hollow spindle, B.

The tool is made fast to this spindle by a screwed rod, B', which passes through a central hole in the tool, (see fig. 3,) and extends upward and projects through the hollow spindle, above which it receives a nut which secures it in position.

The lower end of the screwed rod expands laterally, forming a conical head which binds against the tool as the nut is tightened, and holds it firmly up to the spindle B.

To prevent the rod from turning in the grip of the rod and spindle, a hole is made in the tool to receive a stud which projects from the end of the spindle.

This spindle B turns in bearings in a standard, C, bolted to a table, D.

This table is fitted with adjustable guides E, between which the wood to be operated upon is passed under the cutter.

Keyed to the spindle B is a band-pulley, F, which receives motion from any prime mover for giving rotary motion to the cutter.

The spindle B, at its upper end, carries a metal strap or link, G, between two fixed collars, which strap or link is pierced vertically to receive a fixed screw, H, projecting upward from the standard C.

The strap or link is loose upon the spindle and screw, and it is embraced by adjusting nuts on the screw, as well as by the collars on the spindle. By turning these nuts up or down the spindle will be raised or lowered, and the tool may consequently be thereby adjusted to suit the work in hand.

Referring to fig. 1, it will be seen that the alternate teeth $a$ $a$ are beveled on their upper faces, while the teeth $b$ $b$ show no bevel.

The under sides of the teeth $a$ $a$ are similar to the upper sides of the teeth $b$ $b$, and the under sides of the teeth $b$ $b$ are beveled at their edges like the upper sides of the teeth $a$ $a$.

When the tool is made to suit all kinds of work, as is the case with that shown at figs. 1 and 2, it is furnished with say four teeth unbeveled.

These teeth are shown at $c$ $c$, and they are arranged at equal distances from each other, and, by preference, I make them rather shorter than the other teeth.

The use of these teeth is to square the angles when a groove is being cut, in which case the tool acts as a rotary saw and cuts at the point of the teeth, and it will be seen that, by the action of the tool, the desired work is performed gradually and by successive operations, which first prepare and then complete the desired result, and so render the mechanical action of the tool analogous to the manual action of a skilled workman.

Having now explained the nature of my invention and the manner in which it is to be performed, I wish it to be understood that I claim—

1. The hollow spindle B, provided with a stud, and expanded at the lower end, and the screwed-rod B', in combination with the saw A, all constructed and arranged as and for the purpose shown and described.

2. The rod B', spindle B, strap or link G, screw H and adjusting nuts, and the arm C and guides E E, all constructed and arranged as shown and described, to form an improved planing-machine.

3. The hollow spindle B provided with fixed collars, the strap or link G, and screw H, arranged with the arm or frame C, as and for the purpose specified.

In witness whereof, I, the said THOMAS LLEWELLYN, have hereunto set my hand the fourth day of August, in the year of our Lord one thousand eight hundred and seventy.

THOMAS LLEWELLYN. [L. S.]

Witnesses:
  H. B. WHITE,
    66 *Chancery Lane.*
  DANL. FORSHAW,
    *Royal Exchange, London.*